(12) United States Patent
Masala et al.

(10) Patent No.: US 11,681,832 B2
(45) Date of Patent: Jun. 20, 2023

(54) ELECTRONIC CIRCUIT IDENTIFICATION (ID) TECHNIQUES USING BOTH A CLIENT-SIDE ID AND A SUPPLIER-SIDE ID

(71) Applicant: Infineon Technologies AG, Neubiberg (DE)

(72) Inventors: Luigi Masala, Padua (IT); Alberto Dall'Arche, Padua (IT); Adolfo De Cicco, Castel d'Azzano (IT)

(73) Assignee: Infineon Technologies AG, Neubiberg (DE)

( * ) Notice: Subject to any disclaimer, the term of this patent is extended or adjusted under 35 U.S.C. 154(b) by 262 days.

(21) Appl. No.: 17/070,855

(22) Filed: Oct. 14, 2020

(65) Prior Publication Data

US 2022/0114286 A1 Apr. 14, 2022

(51) Int. Cl.
*H04L 29/06* (2006.01)
*G06F 21/76* (2013.01)
*G06F 21/73* (2013.01)

(52) U.S. Cl.
CPC .............. *G06F 21/76* (2013.01); *G06F 21/73* (2013.01)

(58) Field of Classification Search
CPC .................................. G06F 21/76; G06F 21/73
See application file for complete search history.

(56) References Cited

U.S. PATENT DOCUMENTS

| | | | |
|---|---|---|---|
| 7,111,167 B1 * | 9/2006 | Yeung | H04L 9/3271 713/181 |
| 10,657,293 B1 * | 5/2020 | Wei | H04L 9/0866 |
| 2007/0288765 A1 | 12/2007 | Kean | |
| 2009/0165086 A1 | 6/2009 | Trichina et al. | |
| 2010/0131756 A1 | 5/2010 | Schneider | |
| 2013/0086136 A1 | 4/2013 | Inglett et al. | |
| 2014/0205092 A1 | 7/2014 | Hartley et al. | |
| 2016/0217545 A1 * | 7/2016 | Diehl | G06T 1/0021 |
| 2018/0278418 A1 | 9/2018 | Chang et al. | |
| 2021/0141744 A1 * | 5/2021 | Van Leeuwen | G11C 7/24 |

* cited by examiner

*Primary Examiner* — Wasika Nipa
(74) *Attorney, Agent, or Firm* — Shumaker & Sieffert, P.A.

(57) ABSTRACT

An apparatus may comprise an electronic circuit configured to perform one or more functions or operations, and a memory associated with the electronic circuit. The memory stores a customer-side circuit identification (ID) comprising watermark value combined with a pseudo-random number that is generated as a function of a seed value, wherein the seed value is based on a timestamp generated by computer. An external interface may be coupled to the memory, wherein the external interface provides read-access to the customer-side circuit ID.

15 Claims, 6 Drawing Sheets

ELECTRONIC CIRCUIT IDENTIFICATION (ID) TECHNIQUES USING BOTH A CLIENT-SIDE ID AND A SUPPLIER-SIDE ID

TECHNICAL FIELD

This disclosure relates electronic circuits, such as analog circuits, digital circuits, mixed-signal circuits or combinations of such circuits, and more specifically, integrated circuits manufactured for a specific use within a larger system or device.

BACKGROUND

Electronic circuits are used in a wide variety of applications and settings. An electronic circuit may comprise electronic elements, such as resistors, transistors, capacitors, inductors, diodes, or other electronic elements connected by conductive elements, wires, or traces. The combination and arrangement of electronic elements allows for simple or complex operations to be performed by the electronic circuit based on current flow and/or voltages defined within the electronic circuit.

Electronic circuits can be constructed of discrete components connected by individual pieces of wire, but it is much more common to create interconnections by photolithographic techniques on a laminated substrate (such as a printed circuit board) and solder the components to these interconnections to create a finished circuit. With an integrated circuit, the components and interconnections are formed in the same substrate as part of an integrated circuit fabrication process. For example, integrated circuits are typically formed in a semiconductor material such as doped silicon or gallium arsenide. However, other materials, such as gallium nitride, may also be used for high speed transistors or other electronic elements.

Many integrated circuits are fabricated for use within larger devices and systems. For example, modern automobiles (as well as many modern devices and systems) make use of hundreds or thousands of individual circuits to operate different components. The various circuits of automobiles, for example, may include charging circuits, starting circuits, safety switches, ignition system circuits, lighting circuits for interior or exterior lights, lighting circuits for vehicle headlamps, circuits for instruments or instrument panels, circuits for gages and accessors, motor controls, communication circuits, automotive wiring and fuses, and other circuits. Like automobiles, a vast variety of other modern devices may implement many electronic circuits to control the functionality of the devices. This has resulted in a global supply chain whereby circuit suppliers commonly manufacture and supply individual circuits that are then connected and assembled into a larger system or device. Tracking and tracing the operational integrity and lifespan of such circuits assembled into devices in the supply chain can be very challenging.

SUMMARY

In general, this disclosure is directed to techniques for generating and storing circuit identification (ID) numbers for electronic circuits. The techniques may be used by a circuit supplier to create and store unique circuit ID numbers that can be used by customers to track their circuits and monitor circuit performance. The techniques may be used to create customer-side circuit ID numbers for circuits and store the customer-side circuit ID numbers in memories associated with the circuits. The customer-side circuit ID numbers may be stored in a protected fashion in memory, whereby the customer-side circuit IDs are accessible from the memory based on a customer key. The customer-side circuit IDs may be created by combining a watermark value with a pseudo-random number, and the pseudo-random number may be based on seed value generated based on a computer timestamp.

In some cases, in addition to the customer-side ID, the memory associated with a circuit may also store a supplier-side circuit ID, and/or circuit parameters. A customer key may be used by the customer to access the customer-side circuit ID, but the supplier-side circuit ID numbers may be inaccessible using the customer key, which may be desirable in order to ensure that confidential supplier-side circuit information is unavailable to customers. A supplier key may allow the supplier to access the supplier-side circuit ID, the circuit parameters, or any other items in the memory that are otherwise inaccessible using the customer key. The described techniques for generating the customer-side IDs may create a significant level of entropy in the customer-side IDs, which may allow the customer-side IDs to be authenticated relative to counterfeit circuits that have counterfeit customer-side IDs.

In one example, this disclosure describes an apparatus comprising an electronic circuit configured to perform one or more functions or operations, a memory associated with the electronic circuit, and external interface coupled to the memory. The memory stores a customer-side circuit ID comprising a watermark value combined with a pseudo-random number that is generated as a function of a seed value, wherein the seed value is based on a timestamp generated by computer. The external interface provides read-access to the customer-side circuit ID.

In another example, this disclosure describes a method that comprises manufacturing an electronic circuit, generating a customer-side circuit ID, wherein the customer-side circuit ID comprises watermark value combined with a pseudo-random number that is generated as a function of a seed value, wherein the seed value is based on a timestamp generated by computer, and storing the customer-side circuit ID in a memory associated with the electronic circuit, wherein the customer-side ID is accessible via an external interface coupled to the memory, and wherein the external interface provides read-access to the customer-side circuit ID using a customer key.

In another example, this disclosure describes a method that comprises receiving a set of customer-side IDs associated with a plurality of circuits from a customer, determining entropy associated with the customer-side IDs, and identifying whether the circuits are a counterfeit circuit based on the determined entropy.

Details of these and other examples are set forth in the accompanying drawings and the description below. Other features, objects, and advantages will be apparent from the description and drawings, and from the claims.

DETAILED DESCRIPTION

This disclosure is directed to techniques for generating and storing circuit identification (ID) numbers for electronic circuits. Electronic circuits are used in a wide variety of applications and settings. An electronic circuit may comprise electronic elements, such as resistors, transistors, capacitors, inductors, diodes, or other electronic elements connected by conductive elements, wires, or traces. The combination and arrangement of electronic elements allows for simple or complex operations to be performed by the electronic circuit based on current flow and/or voltages defined within the electronic circuit.

There is a global supply chain for electrical circuits. Circuit suppliers commonly manufacture and supply individual circuits that are then connected and assembled by customers into a larger system or device. Tracking and tracing the operational integrity and lifespan of such circuits can be very challenging. In order to aid such tracking and tracing, unique circuit ID numbers for individual circuits are desirable.

The techniques of this disclosure may be used by a circuit supplier to create and store unique circuit ID numbers that can be used by its customers to track their circuits and monitor circuit performance. In particular, the techniques may be used to create customer-side circuit ID numbers for circuits and store the customer-side circuit ID numbers in memories associated with the circuits. The customer-side circuit ID numbers may be stored in a protected fashion in memory, whereby the customer-side circuit IDs are accessible from the memory based on a customer key. The customer-side circuit IDs may be created by combining a watermark value with a pseudo-random number, and the pseudo-random number may be based on seed value generated based on a computer timestamp.

In some cases, in addition to the customer-side ID, the memory associated with a circuit may also store a supplier-side circuit ID, and/or circuit parameters. A customer key may be used by the customer to access the customer-side circuit ID, but the supplier-side circuit ID numbers may be inaccessible using the customer key, which may be desirable in order to ensure that confidential supplier-side circuit information is unavailable to customers. A supplier key may allow the supplier to access the supplier-side circuit ID, the circuit parameters, or any other items in the memory that are otherwise inaccessible using the customer key. The techniques used for generating the customer-side IDs may create a significant level of entropy in the customer-side IDs, which may allow the customer-side IDs to be authenticated relative to counterfeit circuits that have counterfeit customer-side IDs.

Figure 1:
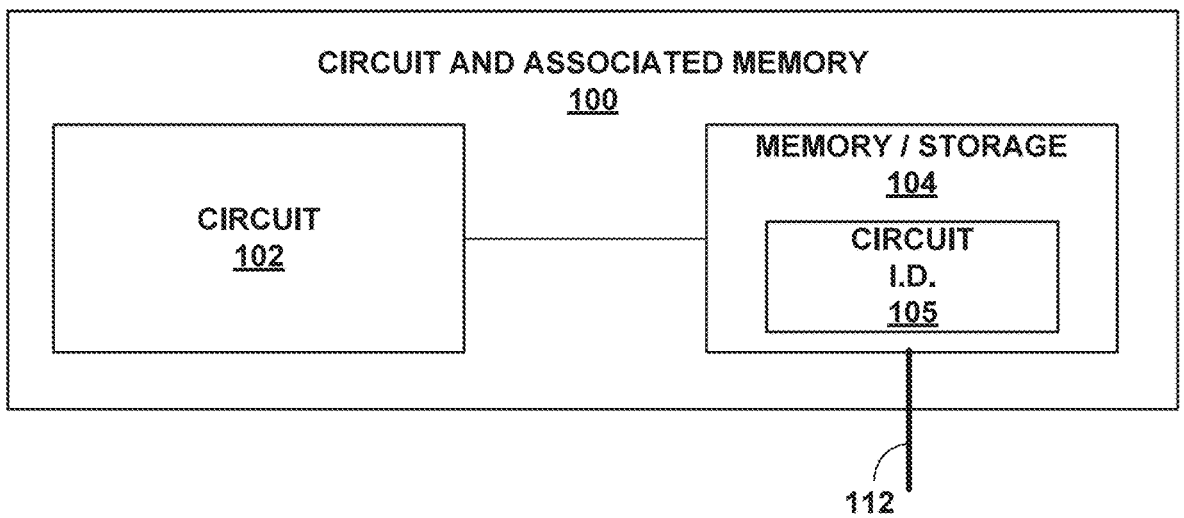
FIG. 1 is a block diagram illustrating an example circuit and an associated memory.

FIG. 1 is a block diagram illustrating an example apparatus 100 comprising a circuit 102 and an associated memory 104. Circuit 102 may comprise any electronic circuit configured to perform one or more functions or operations. Memory 104 is associated with circuit 102. In some cases, circuit 102 comprises an integrated circuit (IC) and memory 104 is electrically connected to the IC. In other cases, circuit 102 comprises IC formed in an IC substrate material (e.g., silicon or another semiconductor material) and memory 104 is also formed in the same IC substrate. In any case, memory 104 may comprise a non-volatile memory configured to store information in a non-volatile, permanent, or semi-permanent manner. As examples, memory 104 may comprise one-time programmable memory (OTP), Flash memory, read-only memory (ROM), electrically erasable programmable read-only memory (EEPROM), erasable programmable read-only memory (EPROM), ferroelectric random access memory (RAM), a physical computer storage device, an electrically programmable fuse or fuse bank, or any other computer storage capable of storing information in a non-volatile, permanent, or semi-permanent manner.

Apparatus 100 also includes an external interface 112 coupled to memory 104. In accordance with this disclosure, memory 104 stores a customer-side circuit ID 105. Moreover, according to this disclosure, customer-side circuit ID 105 may comprise a watermark value combined with a pseudo-random number that is generated as a function of a seed value, and the seed value is based on a timestamp generated by a computer. Additional details on techniques for generating customer-side circuit ID 105 are described in more detail below.

In some examples, external interface 112 provides read-access to the customer-side circuit ID stored in memory 104. In particular, in some examples, external interface 112 provides the read-access to customer-side circuit ID 105 based on a customer key such that the customer-side circuit ID 105 is accessible from memory 104 using the customer key. For example, the customer key may comprise a number, a password, a passcode that the customer can use to access a specific part of memory 104 that stores customer-side ID 105. In these examples, without the customer key (or another legitimate key) to unlock the specific part of memory that stores customer-side ID 105, customer-side ID 105 may be otherwise inaccessible from memory 104. In other examples, however, read-access to the customer-side circuit ID stored in memory 104 may be unprotected.

Figure 2:
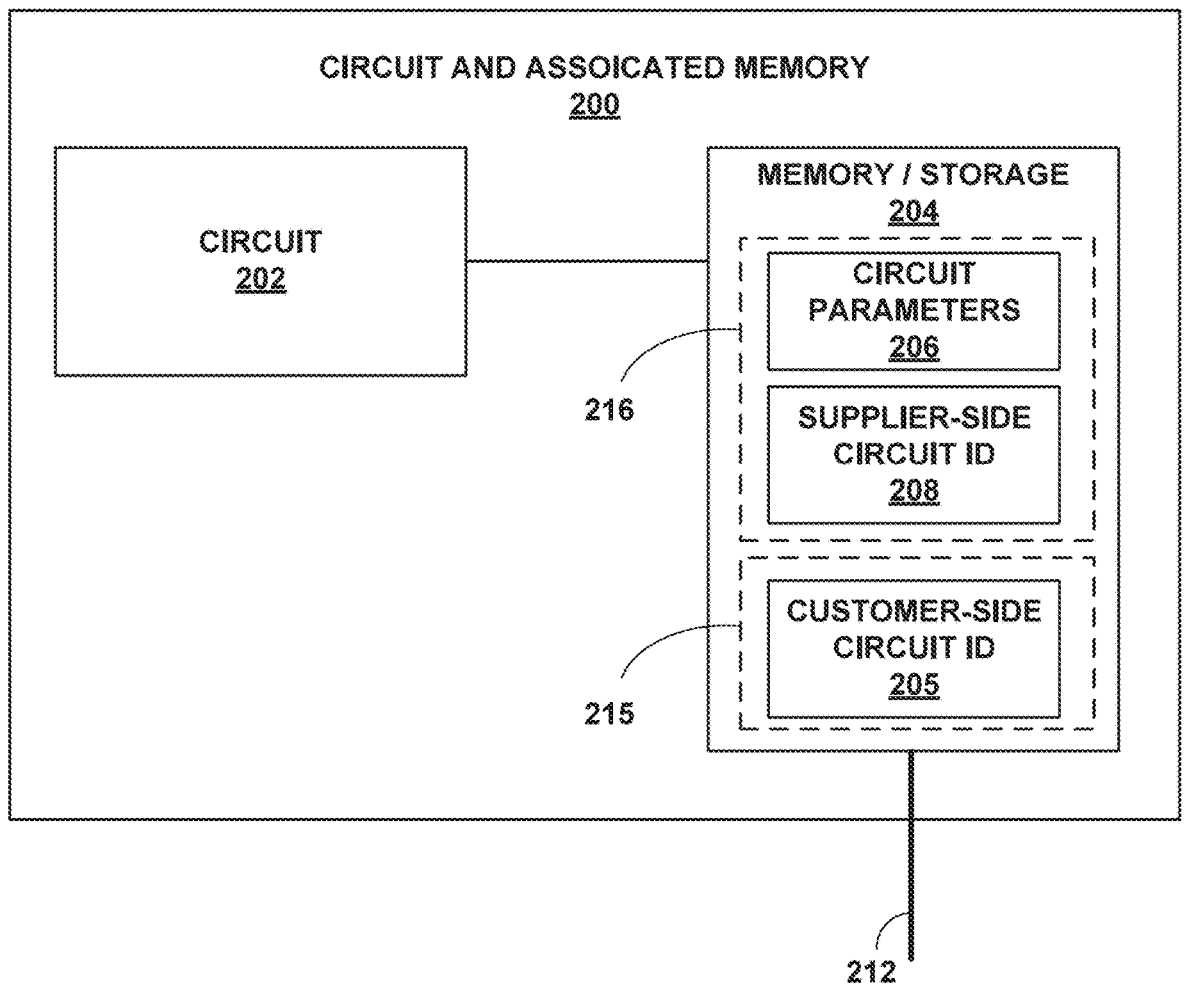
FIG. 2 is another block diagram illustrating an example circuit and an associated memory.

As mentioned, in some cases, in addition to the customer-side ID, the memory associated with a circuit may also store a supplier-side circuit ID, and/or circuit parameters. FIG. 2 is a block diagram illustrating an example apparatus 200 comprising a circuit 202 and an associated memory 204. In this example, memory 204 stores both a customer-side circuit ID 205 and a supplier side circuit ID 208.

Circuit 202 of FIG. 2 (like circuit 102 of FIG. 1) may comprise any electronic circuit configured to perform one or more functions or operations. Memory 204 is associated with circuit 202. In some cases, circuit 202 comprises an IC and memory 204 is electrically connected to the IC, while in other cases, circuit 202 comprises IC formed in an IC substrate material (e.g., silicon or another semiconductor material) and memory 204 is also formed in the same IC substrate. Memory 204 may comprise a non-volatile memory configured to store information in a non-volatile, permanent, or semi-permanent manner. As examples, memory 104 may comprise OTP, Flash memory, ROM, EEPROM, EPROM, ferroelectric RAM, a physical computer storage device, or any other computer storage capable of storing information in a non-volatile, permanent, or semi-permanent manner.

Apparatus 200 also includes an external interface 212 coupled to memory 204. In accordance with this disclosure, memory 204 stores a customer-side circuit ID 205 and a supplier side circuit ID 208. Customer-side circuit ID 205 may be stored in a first portion 215 of memory 204, whereas supplier-side circuit ID 208 may be stored in a second portion 216 of memory. The different portions of memory (portion 215 and portion 216) may be accessible via keys, which may comprise numbers, passwords, or passcodes that can use to access specific parts of memory 204. For example, a supplier key may allow access to both portions (i.e., first portion 215 and second portion 216) of memory, whereas a customer key may allow access to first portion 215 of memory and may not allow access to second portion 216 of memory. In this way, although supplier-side circuit ID is stored in memory 204, it may be inaccessible to customers. In some cases, memory 204 may also be used to store circuit parameters 206, such as one or more calibration values, trimming values, and offset values, configured settings for the circuit, circuit parameters of individual circuit elements, or anything that me be used to adjust or tune circuit operation. Circuit parameters 206 may be stored in second portion 216 of memory 204 so that customers are unable to view or modify circuit parameters 206. In other cases, however, circuit parameters 206 could be stored in first portion 215 of memory or in a totally different "third" portion that may be accessible or inaccessible based on the customer key.

External interface 212 provides read-access to customer-side circuit ID 205 stored in memory 204. In particular, external interface 212 provides the read-access to customer-side circuit ID 205 based on a customer key such that the customer-side circuit ID 205 is accessible from memory 204 using the customer key. Similarly, external interface 212 also provides read-access to supplier-side circuit ID 205 stored in memory 204 based on a supplier key such that the supplier-side circuit ID 208 is accessible from memory 204 using the customer key. External interface 212 also provides read-access to circuit parameters 206 stored in memory 204 based on the supplier key. In some cases, the supplier key may allow access to everything in memory 204, including first portion 215 of memory 204 and second portion 216 of memory 204. The customer key, in contrast, may allow access to first portion 215 of memory 204 and may not allow access to second portion 216 of memory 204. In this way, supplier-side circuit ID and circuit parameters 206 may be accessible to the supplier but inaccessible to customers.

The customer key and the supplier key may each comprise a number, a password, a passcode that the customer or supplier can use to access specific parts of memory 204 that stores customer-side ID 205, supplier-side ID 208, and circuit parameters 206. Without the customer key (or another legitimate key) to unlock the specific part of memory that stores customer-side ID 205, customer-side ID 205 is otherwise inaccessible from memory 204. Again, the supplier key may allow access to everything in memory 204, including first portion 215 of memory 204 and second portion 216 of memory 204, whereas the customer key may only allow access to first portion 215 of memory 204 and may not allow access to second portion 216 of memory 204.

According to this disclosure, customer-side circuit ID 205 comprises a watermark value combined with a pseudo-random number that is generated as a function of a seed value, and the seed value is based on a timestamp generated by a computer. Additional details on techniques for generating customer-side circuit ID 205 are described in more detail below. Supplier-side circuit ID 208 may comprise a serial number that is associated with production of circuit 202, which may be confidential and proprietary to the supplier. Accordingly, it may be undesirable to share supplier-side circuit ID 208 with customers. In order to aid customers, however, memory 204 stores customer-side ID 205 in a portion 215 of memory 204 that is accessible to customers (e.g., based on the customer key).

Figure 3:
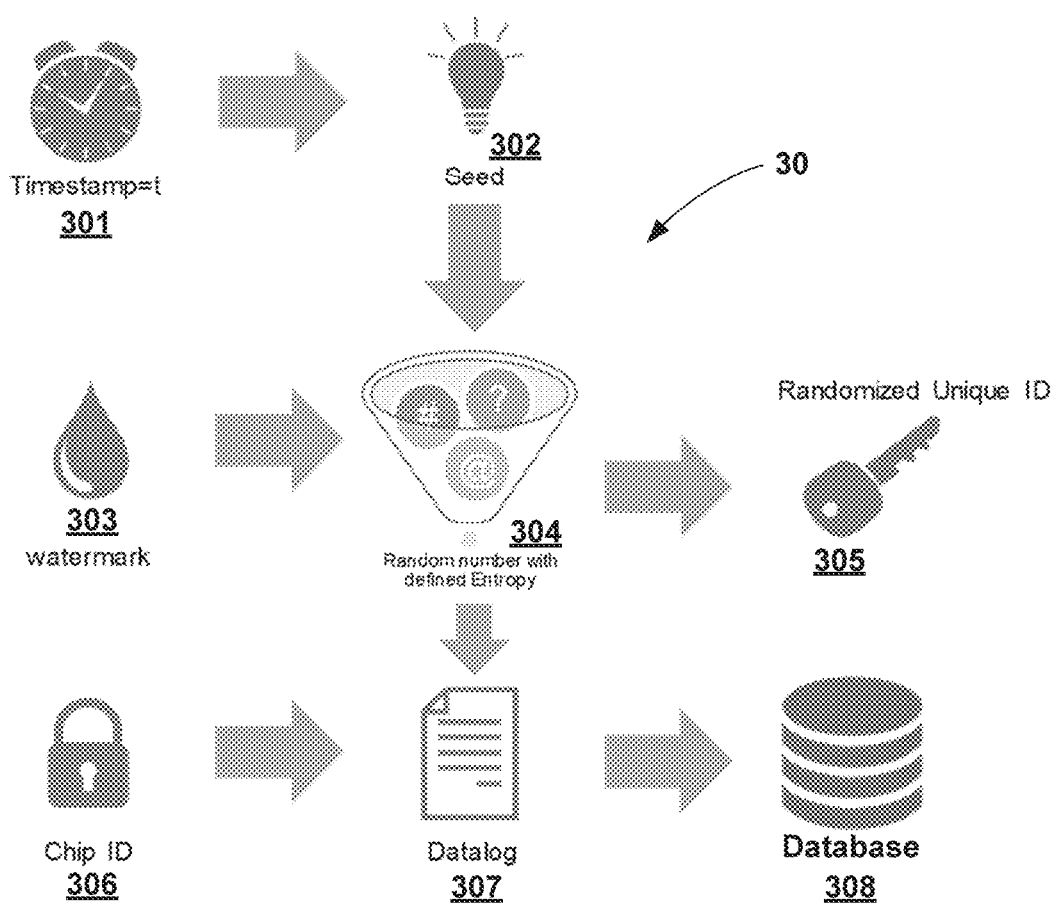
FIG. 3 is a conceptual flow diagram illustrating a technique for generating and storing a unique pseudo-random customer-side circuit ID for a circuit.

FIG. 3 is a conceptual flow diagram illustrating a technique 30 for generating and storing a unique pseudo-random customer-side circuit ID for a circuit. As shown in FIG. 3, a computer is used to generate a computer timestamp 301 and a seed value 302 is generated based on timestamp 301. For example, seed value 302 may be the same as timestamp 301 or seed value 302 may be otherwise based on timestamp 301, such as according to a mathematical function. A random number generator can be used to generate a random number 304 based on seed value 302 and a watermark value 303 can be inserted (or hidden) within random number 304 to create a randomized unique ID 305. Randomized unique ID 305 may be used as the customer-side ID and stored in a memory associated with a circuit as described herein. In addition, the customer-side ID may be associated with supplier-side ID (e.g., chip ID 306) and this association may be stored in a datalog 307 within a supplier database 308.

Figure 4:
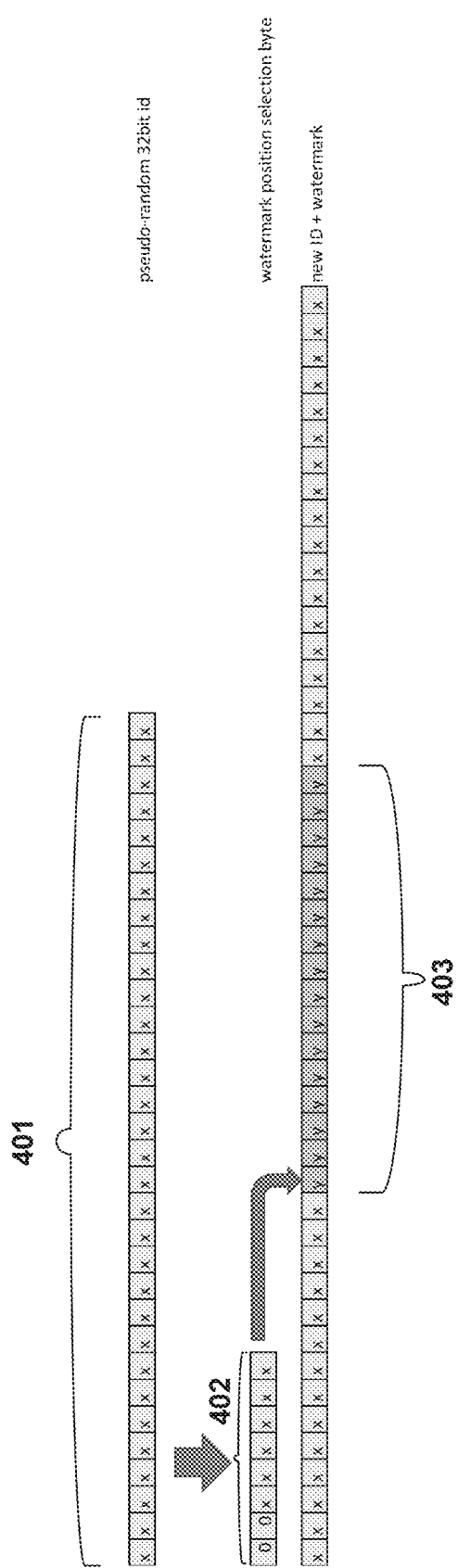
FIG. 4 is a conceptual diagram showing an example combination of a pseudo-random number value with a watermark value consistent with one or more techniques of this disclosure.

FIG. 4 is a conceptual diagram showing an example combination of a pseudo-random number value with a watermark value consistent with one or more techniques of this disclosure for creating a customer-side ID. Customer-side ID may comprise greater than or equal to 32 bits of data, which can help to ensure a high level of entropy. As shown in FIG. 4, a 32-bit pseudo random number 401 may be generated by a random number generator that uses a computer timestamp as a seed value. A beginning portion 402 of pseudo-random number 401 (or another defined portion) may be used to define a location for insertion of watermark value 403. In this way, watermark value 403 is enclosed within portion of pseudo-random number 401, and the combination of watermark value 403 and pseudo-random number 401 defines the customer-side ID. The beginning portion 402 of pseudo-random number 401 (or another defined portion) may define information that identifies the location of watermark value 403 within pseudo-random number 401. Beginning portion 402 is just one example of a defined subset of bits of pseudo-random number that may be used to define a location of watermark value 403. In other example, other portions or any pre-defined subset of bits of pseudo-random number may be used to define the hidden location of watermark value 403 within pseudo-random number 401.

Watermark value 403 may be generally fixed for a plurality of circuits and used in generating a plurality of customer-side circuit IDs for the plurality of circuits. Different computer timestamps may define different seed values for generating different customer-side IDs, and therefore, the different customer-side circuit IDs would be unique even though they may share watermark value 403 that is inserted a location within the pseudo-random number. Again, the location of the watermark may be defined by subset of bits of the pseudo-random number, such as a beginning portion 402 of pseudo-random number 401 or another pre-defined portion of bits. Customer-side IDs created according to this disclosure may also be useful to a supplier for use in authenticating circuits in the event a customer wants circuit diagnostics or other circuit information from the supplier. Additional details on the use of entropy associated with customer-side IDs is discussed below.

As an example, the following pseudo-code may be implemented as a random number generator that uses a computer time stamp as a seed value for random number generation. Of course, other types of random number generators could also be used:

```
//----------------------------------------------------------
    inline static uint32_t squares_8(uint64_t ctr, uint64_t key) {
        uint64_t x, y, z,x1,x2,x3,x4;
        y = x = ctr * key; z = y + key;
        x = x*log(x) + y;
        x1=x & 0x000000000000ffff; x1=(x1>>8) | (x1<<8);
        x2=x & 0x00000000ffff0000; x2>>=16;x2=(x2>>8) | (x2<<8); x2<<=16;
        x1=x1 | x2;
        x3=x & 0x0000ffff00000000; x2>>=32;x2=(x2>>8) | (x2<<8); x2<<=32;
        x4=x & 0xffff000000000000; x2>>=48;x2=(x2>>8) | (x2<<8); x2<<=48;
        x3=x3 | x4;
        x1=x & 0x00000000ffffffff; x1=(x1>>16) | (x1<<16);
        x3=x & 0xffffffff00000000; x3>>=32;x3=(x3>>16) | (x3<<16); x3<<=32;
        x=x1 | x3;
        x1=x & 0xffff00000000ffff;
        x2=x & 0x0000ffffffff0000;x2=(x2>>16) | (x2<<16);
        x=x1 | x2;
        // x = (x>>32) | (x<<32);  /* round 1 */
        x = x*log(x) + z;
        x1=x & 0x000000000000ffff; x1=(x1>>8) | (x1<<8);
        x2=x & 0x00000000ffff0000; x2>>=16;x2=(x2>>8) | (x2<<8); x2<<=16;
        x1=x1 | x2;
        x3=x & 0x0000ffff00000000; x2>>=32;x2=(x2>>8) | (x2<<8); x2<<=32;
        x4=x & 0xffff000000000000; x2>>=48;x2=(x2>>8) | (x2<<8); x2<<=48;
        x3=x3 | x4;
        x1=x & 0x00000000ffffffff; x1=(x1>>16) | (x1<<16);
        x3=x & 0xffffffff00000000; x3>>=32;x3=(x3>>16) | (x3<<16); x3<<=32;
        x=x1 | x3;
        x1=x & 0xffff00000000ffff;
        x2=x & 0x0000ffffffff0000;x2=(x2>>16) | (x2<<16);
        x=x1 | x2;
        //x = (x>>32) | (x<<32);  /* round 2 */
        return (x*x + y) >> 32;  /* round 3
*/
    };
//----------------------------------------------------------
    uint64_t generate_randomnum(uint64_t mycount)
    {
        uint64_t mycount1,shifter,shifter2,temp;
        mycount1=0;
        shifter=squares_8(mycount,key1);
        shifter2=shifter & 0x000ff000;shifter2>>=12;
        shifter&=0x0001f000;shifter>>=12;
        mycount1=squares_8(mycount,key4);
        temp=mycount1>>shifter;
        temp<<=shifter; //temp equals only the high side part of the number
        mycount1-=temp; //mycount1 is now only the low side part of the number
        temp<<=8; //shift 8 bit upwards temp
        mycount1+=temp;// previous random generated number with room for the watermark
        mycount1+=(watermark<<shifter);// add the watermark
        mycount1+=shifter2<<40;
        return mycount1;
    }
```

Figure 5:
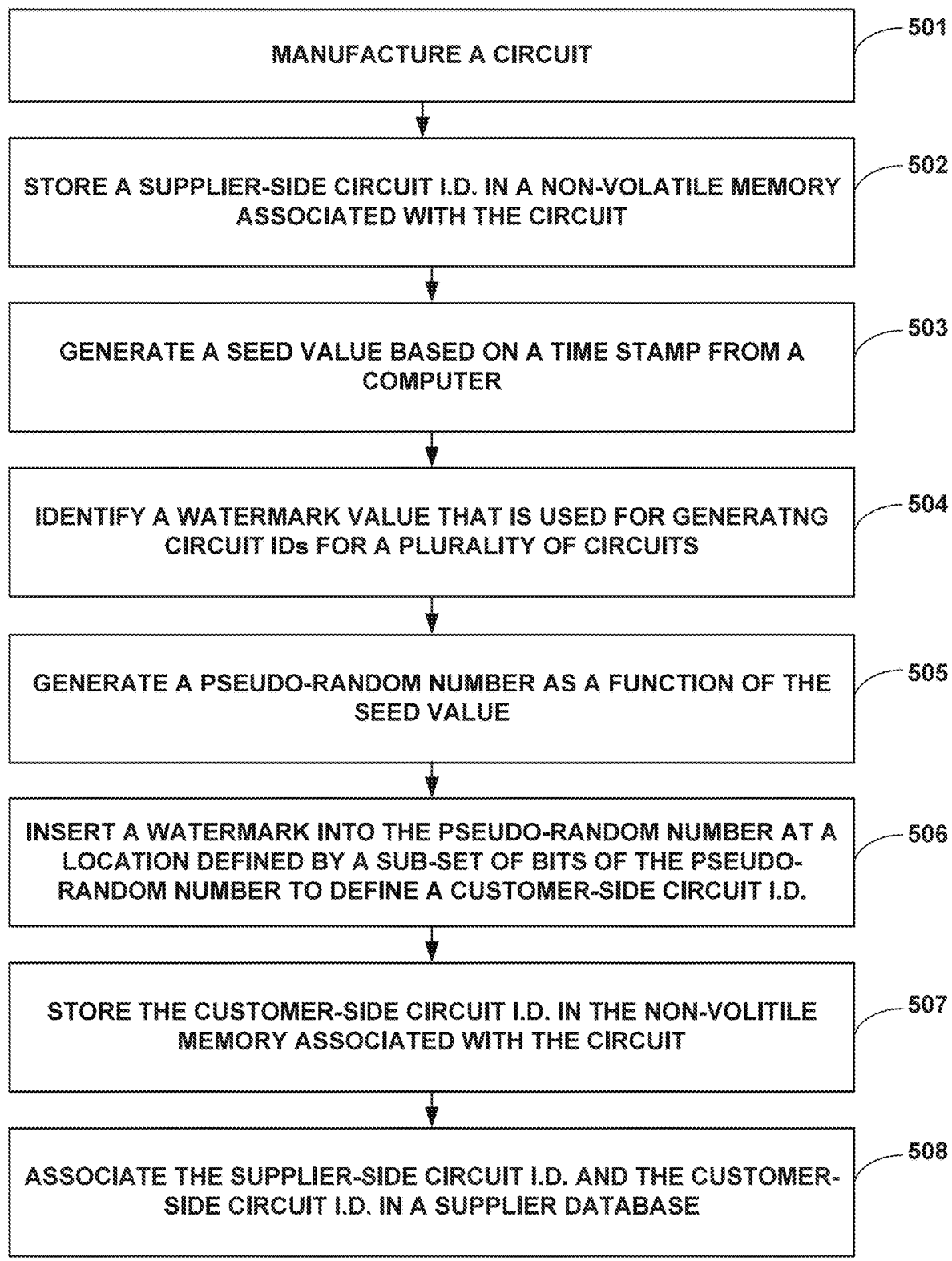
FIG. 5 is a flow diagram showing an example process for storing and associating customer-side and supplier-side circuit IDs for a circuit, consistent with this disclosure.

FIG. 5 is a flow diagram showing an example process for storing and associating customer-side and supplier-side circuit IDs for a circuit, consistent with this disclosure. As shown in FIG. 5, a circuit supplier may manufacture a circuit (501) and store a supplier-side circuit ID in a non-volatile memory associated with the circuit (502). It may be undesirable to allow customer access to the supplier-side circuit ID, and therefore, supplier-side circuit ID may be stored in a protected fashion whereby a supplier key is needed to access the supplier-side circuit ID from the memory. In order to generate a customer-side circuit ID for the customer, the supplier may proceed with steps 503-506 of FIG. 5. In particular, the supplier generates a seed value based on a time stamp from a computer (503) and identifies a watermark value that is used for generating circuit IDs for a plurality of circuits (504). The supplier generates a pseudo-random number as a function of the seed value (505), such as by implementing a process similar to that set forth in the pseudo-code above. The supplier then inserts a watermark into the pseudo-random number at a location defined by a sub-set of bits of the pseudo-random number (506), in a manner similar to that illustrated in FIG. 4. In this way, the supplier may define a customer-side circuit ID that is useful in terms of its lack of confidential supplier-side information and its defined entropy.

The supplier may store the customer-side circuit ID in the non-volatile memory associated with the circuit (507). For example, the customer-side circuit ID may be stored in a location of the memory that is different than that used to store the supplier-side circuit ID. A customer key (or the supplier key) may allow access to the memory that stores the customer-side circuit ID, but the customer key may not allow access to other portions of memory used to store the supplier-side circuit ID. The supplier associates the supplier-side circuit ID and the customer-side circuit ID in a supplier database (508). Accordingly, if a customer returns to the supplier with one or more customer-side circuit IDs, using the supplier database, the supplier may be able to identify the corresponding supplier side circuit IDs based on the customer-side circuit IDs.

Figure 6:
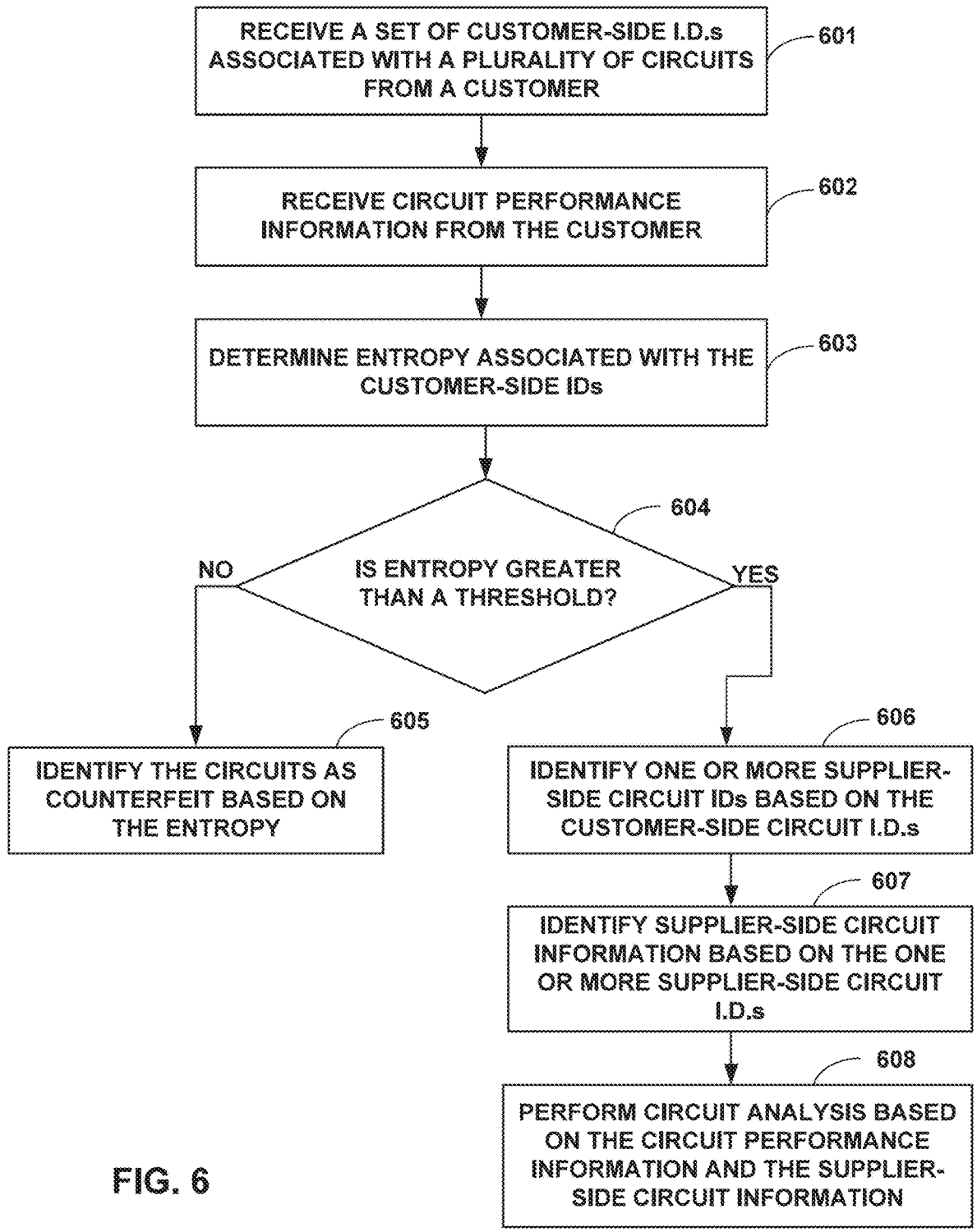
FIG. 6 is a flow diagram showing an example process for analyzing circuits based on a customer-side circuit ID consistent with this disclosure.

FIG. 6 is a flow diagram showing an example process for analyzing circuits based on customer-side circuit ID consistent with this disclosure. As shown in FIG. 6, a circuit supplier may receive a set of customer-side IDs associated with a plurality of circuits from a customer (601). In addition, in some cases, the circuit supplier may also receive circuit performance information form the customer (602). For example, the circuit performance information may comprise information about the circuits associated with the customer-side IDs, and the customer may request analysis from the supplier regarding such circuits.

The supplier may determine entropy associated with the customer-side IDs (603). If the customer-side IDs were generated by the processes described herein, then the customer side IDs would exhibit a high level of entropy such that the different customer-side IDs have little or no correlation. Therefore, the supplier may use the determined entropy in order to identify whether the circuits were manufactured by the supplier or whether the circuits are counterfeit. For example, the supplier may compare the determined entropy to a defined threshold (604). If entropy associated with the customer-side IDs is less than the threshold (no branch of 604), then the supplier may identify the circuits as counterfeit (605). On the other hand, if entropy associated with the customer-side IDs is greater than the threshold (yes branch of 604), then the supplier may verify the circuits as being legitimate and the supplier may take additional steps to analyze the circuits for their customer.

Upon determining that entropy associated with the customer-side IDs is greater than the threshold (yes branch of 604), the circuit supplier may use the customer-side IDs to retrieve additional information about the circuits without needing any possession of the circuits. For example, the supplier may identify one or more supplier-side circuit IDs based on the customer-side IDs (606), such as by performing a lookup in datalog of a supplier database that was used to associate and store customer-side IDs and supplier-side IDs. The supplier may then identify supplier-side circuit information based on the one or more supplier-side circuit IDs (607). This supplier-side circuit information may be proprietary to the supplier, and therefore, it may be undesirable to share the supplier-side information with the customer. However, to help the customer, the supplier may perform circuit analysis using both the customer-supplied circuit performance information and the supplier-side circuit information (608). In this way, the techniques shown in FIG. 6 may both authenticate circuits based on the customer-side IDs, and if authentic, the techniques may allow for circuit analysis by the supplier using proprietary supplier-side information without sharing such information with customer.

The process of determining entropy (603) and comparing the entropy to a threshold (604) may involve an entropy-based analysis of the customer-side IDs that is based on one or more mathematical functions. For example, the process of determining entropy (603) and comparing the entropy to a threshold (604) may involve a process using a two sample Kolmogorov-Smirnov distance using a sufficiently large set of customer devices and another sufficiently large set of supplier devices. The process may involve calculating an empirical cumulative distribution function of the customer-ID of the two sets and calculating the 2 samples Kolmogorov-Smirnov distance between the two empirical cumulative distributions. If the Kolmogorov-Smirnov distance is sufficiently large it may be assumed that the two sets don't come from the same original set of devices.

As another example, the process of determining entropy (603) and comparing the entropy to a threshold (604) may involve a process using a Wald-Wolfowitz runs test. The process may involve one or more devices from customer and one or more devices from supplier. The process may involve calculating for each devices the mean and variance of the customer-ID through the Wald-Wolfowitz runs test. In this example, if the mean and variance of at least one of analyzed devices are significantly different from the others, it may be assumed that the devices don't come from the same original set of devices.

In other example, the supplier may also attempt to retrieve the watermarks from the customer-side IDs based on the subset of bits of the customer-side IDs that identify the location of the watermarks. This attempt to retrieve the watermarks can also be used as part of a circuit authentication process performed by the supplier.

The following examples may illustrate one or more aspects of the disclosure.

Example 1: An apparatus that includes an electronic circuit configured to perform one or more functions or operations; a memory associated with the electronic circuit, wherein the memory stores a customer-side circuit ID comprising a watermark value combined with a pseudo-random number that is generated as a function of a seed value, wherein the seed value is based on a timestamp generated by a computer; and an external interface coupled to the memory, wherein the external interface provides read-access to the customer-side circuit ID.

Example 2: The apparatus of example 1, wherein the external interface provides the read-access to the customer-side circuit ID based on a customer key such that the customer-side circuit ID is accessible from the memory using the customer key.

Example 3: The apparatus of example 1 or 2, wherein the memory stores a supplier-side circuit ID comprising a serial number that is associated with production of the circuit wherein the supplier-side circuit ID is inaccessible using the customer key.

Example 4: The apparatus of example 3, wherein the external interface provides the access to the supplier-side circuit ID based on a supplier key such that the supplier-side circuit ID is accessible from the memory using the supplier key.

Example 5: The apparatus of any of examples 1-4, wherein the memory stores one or more configured settings for the circuit, wherein the configured settings are inaccessible using the customer key.

Example 6: The apparatus of example 5, wherein the one or more configured settings for the circuit include one or more of: a calibration value, a trimming value, and an offset value.

Example 7: The apparatus of any of examples 1-6, wherein the memory comprises a non-volatile memory.

Example 8: The apparatus of any of examples 1-7, wherein the customer-side circuit ID is greater than or equal to 32 bits of data.

Example 9: The apparatus of any of examples 1-8, wherein the watermark value is fixed for a plurality of circuits and used in generating a plurality of circuit IDs for the plurality of circuits.

Example 10: The apparatus of any of examples 1-8, wherein the circuit comprises an integrated circuit (IC) and the memory is connected to the IC.

Example 11: The apparatus of any of examples 1-10, wherein the circuit comprises an IC formed in an IC substrate and the memory is also formed in the IC substrate.

Example 12: The apparatus of example 1, wherein the customer-side ID comprises the watermark value inserted into the pseudo-random number at a location within the pseudo-random number, wherein the location is defined by subset of bits of the pseudo-random number.

Example 13: The apparatus of example 12, wherein the subset of bits comprises a beginning portion of the pseudo-random number.

Example 14: A method that includes manufacturing an electronic circuit; generating a customer-side circuit identification (ID), wherein the customer-side circuit ID comprises watermark value combined with a pseudo-random number that is generated as a function of a seed value, wherein the seed value is based on a timestamp generated by a computer; and storing the customer-side circuit ID in a memory associated with the electronic circuit, wherein the customer-side ID is accessible via an external interface coupled to the memory, and wherein the external interface provides read-access to the customer-side circuit ID using a customer key.

Example 15: The method of example 14, wherein generating the customer-side circuit ID comprises: generating the timestamp; generating the seed value based on the timestamp; generating a pseudo-random number based on the seed value; and generating the customer-side ID based on the watermark value and the pseudo-random number.

Example 16: The method of example 14 or 15, wherein generating the customer-side ID comprises inserting the watermark value into the pseudo-random number at a location within the pseudo-random number, wherein the location is defined by subset of bits of the pseudo-random number Example 17: The method of any of examples 14-16, wherein the method further includes storing a supplier-side circuit ID in the memory, wherein the supplier-side circuit ID is inaccessible from the memory using the customer key and accessible from the memory using a supplier key.

Example 18: The method of any of examples 14-17, wherein the method further includes associating the customer-side circuit ID with a supplier-side circuit ID in a supplier database.

Example 19: A method that includes: receiving a set of customer-side identification (IDs) associated with a plurality of circuits from a customer; determining entropy associated with the customer-side IDs; and identifying whether the circuits are a counterfeit circuit based on the determined entropy.

Example 20: The method of example 19, wherein the method further includes: upon determining that the circuits are not counterfeit, identifying one or more supplier-side circuit IDs based on one or more of the customer-side circuit IDs; and identifying supplier-side circuit information based on the one or more supplier-side circuit IDs.

Example 21: The method of example 19, wherein the method further includes receiving circuit performance information associated with the circuits from the customer; and performing analysis on the circuits based on the circuit performance information and the supplier-side circuit information.

Various aspects have been described in this disclosure. These and other aspects are within the scope of the following claims.

The invention claimed is:

1. An apparatus comprising:
   an electronic circuit configured to perform one or more functions or operations;
   a memory associated with the electronic circuit, wherein the memory stores a customer-side circuit identification (ID) comprising a watermark value combined with a pseudo-random number that is generated as a function of a seed value, wherein the seed value is based on a timestamp generated by a computer, wherein the memory further stores a supplier-side circuit ID comprising a serial number that is associated with production of the circuit, and wherein the customer-side ID and the supplier-side ID are different; and
   an external interface coupled to the memory, wherein the external interface provides read-access to the customer-side circuit ID such that the customer-side circuit ID is accessible from the memory using the customer key, wherein the supplier-side circuit ID is inaccessible using the customer key, and wherein the external interface provides access to the supplier-side circuit ID based on a supplier key such that the supplier-side circuit ID is accessible from the memory using the supplier key, wherein the customer-side ID comprises the watermark value inserted into the pseudo-random number at a pre-defined location within the pseudo-random number, wherein the watermark value comprises a subset of bits hidden in the pseudo-random number.

2. The apparatus of claim 1, wherein the memory stores one or more configured settings for the circuit, wherein the configured settings are inaccessible using the customer key.

3. The apparatus of claim 2, wherein the one or more configured settings for the circuit include one or more of: a calibration value, a trimming value, and an offset value.

4. The apparatus of claim 1, wherein the memory comprises a non-volatile memory.

5. The apparatus of claim 1, wherein the customer-side circuit ID is greater than or equal to 32 bits of data.

6. The apparatus of claim 1, wherein the watermark value is fixed for a plurality of circuits and used in generating a plurality of circuit IDs for the plurality of circuits.

7. The apparatus of claim 1, wherein the circuit comprises an integrated circuit (IC) and the memory is connected to the IC.

8. The apparatus of claim 1, wherein the circuit comprises an integrated circuit (IC) formed in an IC substrate and the memory is also formed in the IC substrate.

9. The apparatus of claim 1, wherein the pre-defined location comprises a beginning portion of the pseudo-random number.

10. A method comprising:
    manufacturing an electronic circuit;
    generating a customer-side circuit identification (ID), wherein the customer-side circuit ID comprises watermark value combined with a pseudo-random number that is generated as a function of a seed value, wherein the seed value is based on a timestamp generated by a computer;
    storing the customer-side circuit ID in a memory associated with the electronic circuit, wherein the customer-side ID is accessible via an external interface coupled to the memory, and wherein the external interface provides read-access to the customer-side circuit ID using a customer key; and
    storing a supplier-side circuit ID in the memory, wherein the supplier-side circuit ID comprises a serial number that is associated with production of the circuit and wherein the supplier-side circuit ID is inaccessible from the memory using the customer key and accessible from the memory using a supplier key, and wherein the customer-side ID and the supplier-side ID are different, and
    wherein the customer-side ID comprises the watermark value inserted into the pseudo-random number at a pre-defined location within the pseudo-random number, wherein the watermark value comprises a subset of bits hidden in the pseudo-random number.

11. The method of claim 10, wherein generating the customer-side circuit ID comprises:
    generating the timestamp;
    generating the seed value based on the timestamp;
    generating a pseudo-random number based on the seed value; and
    generating the customer-side ID based on the watermark value and the pseudo-random number.

12. The method of claim 10, wherein generating the customer-side ID comprises inserting the watermark value into the pseudo-random number at the pre-defined location within the pseudo-random number.

13. The method of claim 10, further comprising:
    associating the customer-side circuit ID with a supplier-side circuit ID in a supplier database.

14. A method comprising:
    receiving a set of customer-side identification (IDs) associated with a plurality of circuits from a customer, wherein the customer side IDs exhibit a high level of entropy such that the different customer-side IDs have little or no correlation;
    determining the entropy associated with the customer-side IDs; and
    identifying whether the circuits are a counterfeit circuit based on whether the determined entropy exceeds a threshold, wherein the method further includes upon determining that the circuits are not counterfeit:

identifying a set of supplier-side circuit IDs based on the set of customer-side circuit IDs;

identifying supplier-side circuit information based on the set of supplier-side circuit IDs, wherein the set of customer-side IDs and the set of supplier-side IDs are different, receiving circuit performance information associated with the circuits from the customer; and performing analysis on the circuits based on the circuit performance information and the supplier-side circuit information, wherein each of the customer-side IDs comprise a watermark value inserted into a pseudo-random number at a pre-defined location within the pseudo-random number, wherein the watermark value comprises a subset of bits hidden in the pseudo-random number.

15. The method of claim 10, wherein the pre-defined location comprises a beginning portion of the pseudo-random number.

* * * * *